C. O. ROBINSON, DEC'D.
E. S. ROBINSON, ADMINISTRATRIX.
PASTEURIZER AND COOLER.
APPLICATION FILED NOV. 22, 1913.
1,162,808.
Patented Dec. 7, 1915.
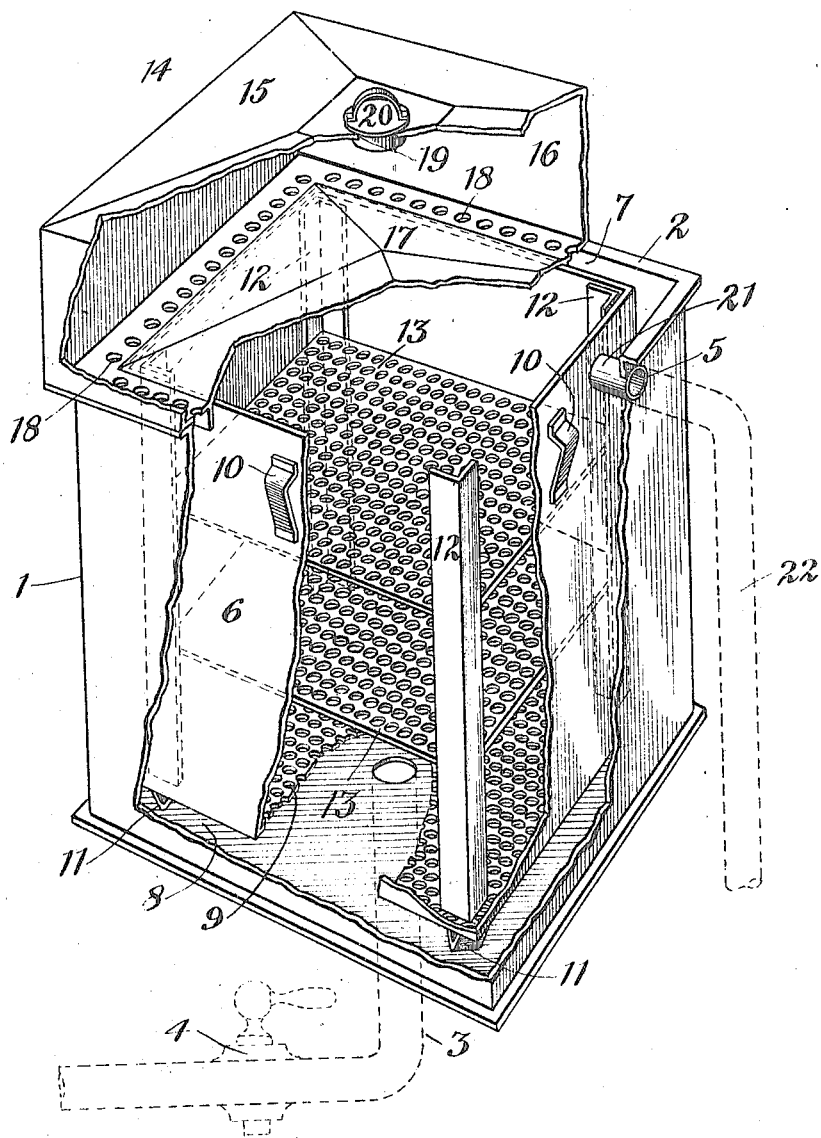
Inventor
Charles O. Robinson
Witnesses

UNITED STATES PATENT OFFICE.

CHARLES O. ROBINSON, OF FREDERICK, MARYLAND; EFFIE S. ROBINSON ADMINISTRATRIX OF SAID CHARLES O. ROBINSON, DECEASED.

PASTEURIZER AND COOLER.

1,162,808.

Specification of Letters Patent. Patented Dec. 7, 1915.

Application filed November 22, 1913. Serial No. 802,467.

*To all whom it may concern:*

Be it known that I, CHARLES O. ROBINSON, a citizen of the United States, residing at Frederick, in the county of Frederick and State of Maryland, have invented certain new and useful Improvements in Pasteurizers and Coolers, of which the following is a specification, reference being had therein to the accompanying drawing.

My invention relates to the art of pasteurizing, and has for its object the production of apparatus for perfectly pasteurizing substances in their containing vessels, such as milk in the bottles, and cooling the same immediately afterward without damaging the vessels or changing the condition of the contents.

I attain my object by providing an inner and an outer container, with an intermural space between them, the inner container having a perforated or recticulated bottom, and being supported above the bottom of the outer container. The milk bottles or other vessels are placed in the inner container, and a cool liquid such as water introduced into the upper portion of the intermural space, so that it will flow down around the inner container and then up through the bottom thereof. A source of heat is applied below said bottom, and means provided for draining off the liquid from the top of the inner container. I provide also a cover for the apparatus which extends over both containers and the intermural space.

The method of pasteurizing which is disclosed herein is claimed in a copending divisional application filed February 27, 1914, Serial No. 821,502. The claims in the present application will be directed particularly to apparatus for practising the method.

My invention is illustrated in the accompanying drawing, which shows the same in perspective, with parts broken away to show the interior construction thereof.

In the drawing 1 designates the outer container, which in this case is a rectangular vessel of copper tinned inside, having a flanged upper edge 2 and a drain pipe 3 leading from the bottom and fitted with a suitable cock 4. An opening 5 is provided in the upper part of one side wall to receive an overflow pipe which will be presently described. Inside the outer container 1 is an inner container 6 of similar shape, but having its dimensions less in all directions, so that a space 7 will be left between the side walls of the inner and outer containers, extending all around between the same, and a similar space 8 beneath the bottom of the inner container. This bottom 9 of the inner container is reticulated or perforated, but the side walls are solid, so that circulation can only take place through the bottom. In order to maintain uniformity of spacing between the inner and outer containers I provide distance pieces or projections, marked 10 and feet 11 preferably on the inner container.

Fitted within the container is a rack composed of four upright angle pieces 12, carrying between them rectangular reticulated or perforated platforms or shelves 13. The rack is readily slid into and out of the inner container, and may be provided with any suitable or desired form of handles for this purpose, or it may be lifted by means of hooks inserted through the upper platform or through openings in the upper ends of the angle pieces.

Overlying and covering both containers is a hollow cover 14, having side walls 16, a top 15 and a bottom 17 with a series of perforations 18 extending all around the edges of the bottom 17 and when the cover is in position, opening communication between the chamber within said cover and the space 7 between the side walls of the inner and outer containers. The top of the cover is provided with a central opening 19 fitted with a plug 20 for the introduction of cooling water.

The inner container is provided with a short drainage pipe or nipple 21 near the top of one of its side walls, and directly opposite this, so as to register therewith when the parts are in position, is the opening 5 in the side wall of the outer container. A suitable overflow pipe 22 is connected to the nipple 21 through the opening 5 during operation.

In practising my method of pasteurizing with the apparatus thus described, the following steps are performed: First the rack 12—13 is removed and filled with bottles, some of which may also be placed upon the perforated bottom of the inner container if desired. I prefer, however, to support the bottles upon the rack alone, so that they can all be removed after sterilization by simply taking out the rack, which can then be reloaded and immediately replaced, or may be replaced without delay by a duplicate rack which has previously been loaded ready for the change. The latter mode of operating of course renders it possible to keep the sterilizer in constant operation without any loss of time. The loaded rack having been dropped into the inner container, the cover 14 is placed in position with its flanged edge fitting around the edge of the outer container and resting upon the upper flange 2 thereof, and its bottom 17, which is slightly domed or coned or otherwise raised, overlying the inner container. The containers are then filled with cool water which may be by means of the pipe 3, or any other suitable means of supply before or after the cover is put on. Heat is then applied to raise the temperature of the water. The simplest way to do this is by means of a flame or burners positioned beneath the bottom of the outer container. It should be understood that suitable heating means may be employed, whether coal, gas, electric or steam, all of which are well known in the art and need no description. The application of heat continues until the temperature of all the contents of the outer container, is raised to 140°, which may be determined by a gage or thermometer, also not shown. This temperature is maintained for the required period of 20 to 30 minutes, and then the supply of heat is cut off, and cold water is introduced into the top 14 through the opening 19, from which the plug 20 is removed for that purpose. This cold water flows into the top, down over the inclined surfaces of the bottom 17, and through the openings 18 into the chamber or space 7 between the inner and outer containers. As the level of the water in this space is thus raised above the level of the drainage pipe or nipple 21, the top layer of hot water in the inner container flows out through the nipple 21 and the overflow pipe 22. At the same time, the cold water has a tendency to sink down and by convection gradually cool the heated water in the chamber or space 7, and also to absorb a certain amount of the heat from the inner container by conduction through the solid side walls thereof. Thus, there is a gradual abstraction of heat, and drainage of hot water from the top, until the cooled water has fallen below the bottom of the inner container when it will commence to rise through the perforated bottom 9, and gradually, both as regards its temperature and as regards its flow, to replace the hot water constantly raising the latter and causing it to drain off through the nipple 21 and pipe 22. At the end of a few minutes the process is complete, because the temperature of the bottles and their contents falls gradually with the temperature of the water surrounding them, and the heat passes off as it should, gradually from bottom to top of every object. After the desired minimum temperature is reached, the inflow of cold water is stopped, the cover 14 is removed and the rack 12—13 slid out and replaced with a fresh charge of bottles.

It is to be understood, that changes may be made in many details of this apparatus, and even in some of the structural features, without departing from the spirit of the invention, and all such changes are contemplated by me as included within the scope of the following claims. For example, I may use the opening in the top of the cover, or any other suitable means for introducing hot as well as cold water in the space between the inner and outer containers. In other words, I may first fill the machine with cold water, and then cause hot water to pass down through the space 7 and up through the bottom 9 of the inner container and out through the pipe 22, thereby gradually heating the bottles, as the cold water drains off from the top. I may also introduce hot water through the pipe 22, and cause it to pass down through the inner container, and then drain off, or I may otherwise vary the use of this apparatus.

The principal and essential feature of the invention is the gradual raising of temperature by convection or conduction or both, and the gradual reduction of the same by circulation, convection, and conduction in the general manner described.

Having thus described my invention what I claim is:

1. In a pasteurizing apparatus, an outer container adapted to hold fluid, an inner container therein, a cover for both containers, and means for draining off heated fluid, said inner container having solid side walls, and a perforated or reticulated bottom, and an interior removable rack containing openings to permit the free circulation of pasteurizing fluid, and said cover extending over the intermural space between the containers and containing a chamber communicating through openings with said intermural space and adapted to receive fluid and conduct the same into said intermural space, whereby when the apparatus is closed and in operation, a continuous circulation of liquid may be produced through the hollow cover into the intermural space, down beneath the inner container, up through the reticulated bottom and the perforated rack around the articles to be pasteurized, and finally out of the drainage pipe in the upper part of the inner container.

2. A pasteurizing apparatus comprising an outer container 1, having solid sides and bottom, an inner container 6 having its several dimensions less than the corresponding dimensions of the outer container and held therein so as to leave a space between the side walls and the bottoms of the two containers, said inner container having its upper part solid and its lower part perforated or reticulated, a perforated or reticulated rack within said inner container, drainage means extending from the upper part of said inner container, and a cover having a top, bottom and side walls inclosing a chamber, said cover being provided with an opening for the introduction of fluid, and said bottom extending over both containers and having a series of peripheral openings communicating with the intermural space between the containers when the cover is in place.

3. In a pasteurizing apparatus, an outer container adapted to hold fluid, an inner container therein, a cover for both containers, and means for draining off heated fluid, said inner container having solid side walls and a perforated or reticulated bottom, and an interior removable rack containing openings to permit the free circulation of pasteurizing fluid, and said cover extending over the intermural space between the containers together with means carried by said cover communicating through openings with said intermural space and adapted to receive fluid and conduct the same into said intermural space, whereby when the apparatus is closed and in operation, a continuous circulation of liquid may be produced through said means into the intermural space, down beneath the inner container, up through the reticulated bottom and the perforated rack around the articles to be pasteurized, and finally out of the drainage pipe in the upper part of the inner container.

4. In a pasteurizing apparatus, an outer container adapted to hold fluid, an inner container therein, a cover for both containers, and means for draining off heated fluid, said inner container having solid side walls and a perforated or reticulated bottom, and an interior removable rack containing openings to permit the free circulation of pasteurizing fluid, and said cover extending over the intermural space between the containers together with means communicating with the upper part of said intermural space through openings distributed over the entire area of said space, said means adapted to receive fluid and conduct the same into said intermural space, whereby when the apparatus is closed and in operation, a continuous circulation of liquid may be produced through said means into the intermural space, down beneath the inner container, up through the reticulated bottom and the perforated rack around the articles to be pasteurized, and finally out of the drainage pipe in the upper part of the inner container.

5. In a pasteurizing apparatus, an outer container adapted to hold fluid, an inner container therein, a cover for both containers, and means for draining off heated fluid, said inner container having solid side walls and a perforated or reticulated bottom, and an interior removable rack containing openings to permit the free circulation of pasteurizing fluid, and said cover extending over the intermural space between the containers, together with means extending over said intermural space and adapted to receive fluid and distribute the same with approximate uniformity over and into the said intermural space, whereby when the apparatus is closed and in operation, a continuous and uniform circulation of liquid of varying temperature may be produced through said means into the intermural space, down beneath the inner container, up through the reticulated bottom and the perforated rack around the articles to be pasteurized, and finally out of the drainage pipe in the upper part of the inner container.

In testimony whereof I affix my signature in presence of two witnesses.

CHARLES O. ROBINSON.

Witnesses:
CLAUDE S. HAHN,
ALBERT S. BROWN.

Copies of this patent may be obtained for five cents each, by addressing the "Commissioner of Patents, Washington, D. C."